United States Patent
Ohashi et al.

(10) Patent No.: US 12,415,520 B2
(45) Date of Patent: Sep. 16, 2025

(54) VEHICLE CONTROL DEVICE

(71) Applicants: TOYOTA JIDOSHA KABUSHIKI KAISHA, Toyota (JP); ADVICS CO., LTD., Kariya (JP)

(72) Inventors: Yuta Ohashi, Toyota (JP); Mitsutaka Tanimoto, Okazaki (JP); Hidehisa Kato, Sunto-gun (JP); Michihiro Otsubo, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 168 days.

(21) Appl. No.: 18/488,192

(22) Filed: Oct. 17, 2023

(65) Prior Publication Data

US 2024/0140435 A1 May 2, 2024

(30) Foreign Application Priority Data

Oct. 31, 2022 (JP) ................................ 2022-174253

(51) Int. Cl.
  *B60W 30/00* (2006.01)
  *B60W 30/18* (2012.01)
  *B60W 30/188* (2012.01)

(52) U.S. Cl.
  CPC .... *B60W 30/188* (2013.01); *B60W 30/18109* (2013.01); *B60W 2520/28* (2013.01)

(58) Field of Classification Search
  CPC ......... B60W 30/188; B60W 30/18109; B60W 2520/28; B60W 40/105; B60W 40/10; B60W 50/029; B60W 50/0205; B60W 2050/0215
  See application file for complete search history.

(56) References Cited

U.S. PATENT DOCUMENTS

| | | | | |
|---|---|---|---|---|
| 11,608,075 | B2* | 3/2023 | Suzuki | B60W 40/107 |
| 2018/0297585 | A1* | 10/2018 | Lian | B60T 8/17552 |
| 2019/0168763 | A1* | 6/2019 | Jung | B62D 7/148 |
| 2019/0322284 | A1* | 10/2019 | Yang | G07C 5/0816 |
| 2020/0031362 | A1* | 1/2020 | Lee | B60W 50/14 |
| 2020/0070849 | A1 | 3/2020 | Suzuki et al. | |
| 2020/0198650 | A1* | 6/2020 | Ribbens | G07C 5/0808 |
| 2021/0094555 | A1* | 4/2021 | Bajpai | B60W 40/105 |
| 2022/0319255 | A1* | 10/2022 | Palai | G07C 5/0808 |

(Continued)

FOREIGN PATENT DOCUMENTS

JP 2020-032894 A 3/2020

*Primary Examiner* — Phutthiwat Wongwian
*Assistant Examiner* — Sherman D Manley
(74) *Attorney, Agent, or Firm* — Oliff PLC

(57) ABSTRACT

A vehicle control device includes a processor. The processor calculates an instruction value of an operation request for controlling an operation of an actuator mounted on a vehicle based on a motion request from an application. The processor executes feedback control on the instruction value using a deviation between the motion request and a motion result of the vehicle that is calculated based on one of detection values of four wheel velocity sensors. The processor calculates the motion result in the feedback control based on a detection value indicating the second largest vehicle body velocity among the vehicle body velocities indicated by the detection values of the four wheel velocity sensors when the vehicle is braked.

4 Claims, 5 Drawing Sheets

(56) References Cited

U.S. PATENT DOCUMENTS

| | | | |
|---|---|---|---|
| 2024/0087372 A1* | 3/2024 | Kimura | B60C 23/061 |
| 2024/0140435 A1* | 5/2024 | Ohashi | B60W 30/18109 |
| 2024/0400131 A1* | 12/2024 | Hosono | B62D 6/00 |

* cited by examiner

VEHICLE CONTROL DEVICE

CROSS-REFERENCE TO RELATED APPLICATION

This application claims priority to Japanese Patent Application No. 2022-174253 filed on Oct. 31, 2022, incorporated herein by reference in its entirety.

BACKGROUND

1. Technical Field

The present disclosure relates to a vehicle control device.

2. Description of Related Art

Japanese Unexamined Patent Application Publication No. 2020-32894 (JP 2020-32894 A) describes a vehicle control device. A control device includes a motion manager. The motion manager includes a reception unit, an arbitration unit, and a generation unit. The reception unit receives a motion request from a plurality of applications. The arbitration unit arbitrates a plurality of the motion requests received by the reception unit. The generation unit generates, for example, an instruction value of an operation request to be output to a brake control unit and a powertrain control unit, based on the arbitration result by the arbitration unit.

A vehicle control device such as that described in JP 2020-32894 A may execute so-called feedback control. For example, the control device calculates how the vehicle is moving based on one of the detection values of four wheel velocity sensors. Then, the control device executes the feedback control on the instruction value of the operation request such that the actual motion of the vehicle matches a motion request from the application. In such a case, when one of the four wheel velocity sensors fails, the detection value of the failed wheel velocity sensor may be too large or too small. Therefore, there is a possibility that, when how the vehicle is moving is calculated based on the detection value of the failed wheel velocity sensor, the instruction value of the operation request cannot be appropriately controlled by the feedback control.

SUMMARY

According to one aspect of the present disclosure, a vehicle control device includes one or more processors. The one or more processors are configured to: calculate a first instruction value of an operation request for controlling an operation of an actuator mounted on a vehicle based on a motion request from an application; and execute feedback control on the first instruction value using a deviation between the motion request and a motion result of the vehicle that is calculated based on one of detection values of four wheel velocity sensors. The one or more processors are further configured to: calculate the motion result in the feedback control based on a first detection value indicating a second largest vehicle body velocity among vehicle body velocities indicated by the detection values of the four wheel velocity sensors when the vehicle is braked; and calculate the motion result in the feedback control based on a second detection value indicating a second smallest vehicle body velocity among the vehicle body velocities indicated by the detection values of the four wheel velocity sensors when the vehicle is not braked.

According to the above configuration, the one or more processors calculate the motion result in the feedback control based on the detection value of the wheel velocity sensor indicating the second largest vehicle body velocity among the vehicle body velocities indicated by the detection values of the four wheel velocity sensors when the vehicle is braked. It is assumed that one of the four wheel velocity sensors fails and the detection value of the failed wheel velocity sensor becomes an excessively large value. Even in this case, the motion result is calculated based on the detection value of the wheel velocity sensor indicating the next largest vehicle body velocity after the wheel velocity sensor having the excessively large value. Therefore, it is possible to suppress the calculated motion result from deviating from the actual motion result.

Further, according to the above configuration, the one or more processors calculate the motion result in the feedback control based on a detection value of the wheel velocity sensor indicating the second smallest vehicle body velocity among the vehicle body velocities indicated by the detection values of the four wheel velocity sensors when the vehicle is not braked. It is assumed that one of the four wheel velocity sensors fails and the detection value of the failed wheel velocity sensor becomes an excessively small value. Even in this case, the motion result is calculated based on the detection value of the wheel velocity sensor that indicates the next smallest vehicle body velocity after the wheel velocity sensor having the excessively small value. Therefore, it is possible to suppress the calculated motion result from deviating from the actual motion result.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment

Figure 1:
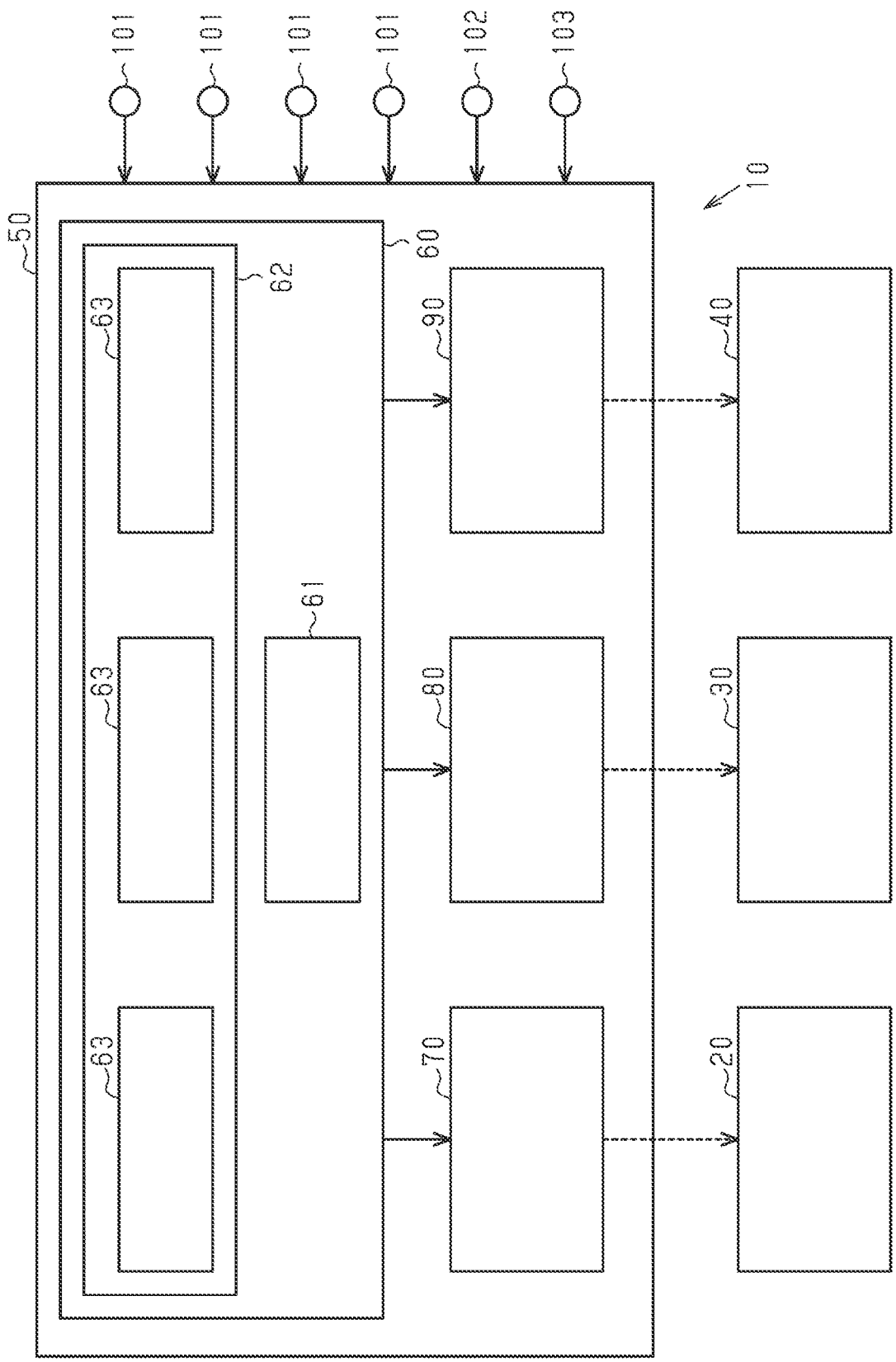
FIG. 1 is a schematic diagram showing an outline of a vehicle.

An embodiment of a vehicle control device will be described below with reference to the drawings.
Outline of Vehicle
As shown in FIG. 1, a vehicle 10 includes an internal combustion engine 20, a steering device 30, a brake device 40, and a control device 50.

The internal combustion engine 20 is a drive source of the vehicle 10. Although not shown, the internal combustion engine 20 includes a plurality of actuators such as a throttle valve, a fuel injection valve, and an ignition device. The control device 50 controls the actuators described above. Accordingly, the internal combustion engine 20 burns fuel and drives the vehicle 10.

The steering device 30 changes the steering angle of a steering wheel of the vehicle 10. The steering device 30 includes an electric power steering system. The control device 50 controls the actuator. Accordingly, the electric power steering system assists the driver's steering operation. Further, the electric power steering system performs a fine adjustment of the driver's steering operation amount or an adjustment of the steering angle without the driver's operation, by the control of the actuator performed by the control device 50.

Figure 2:
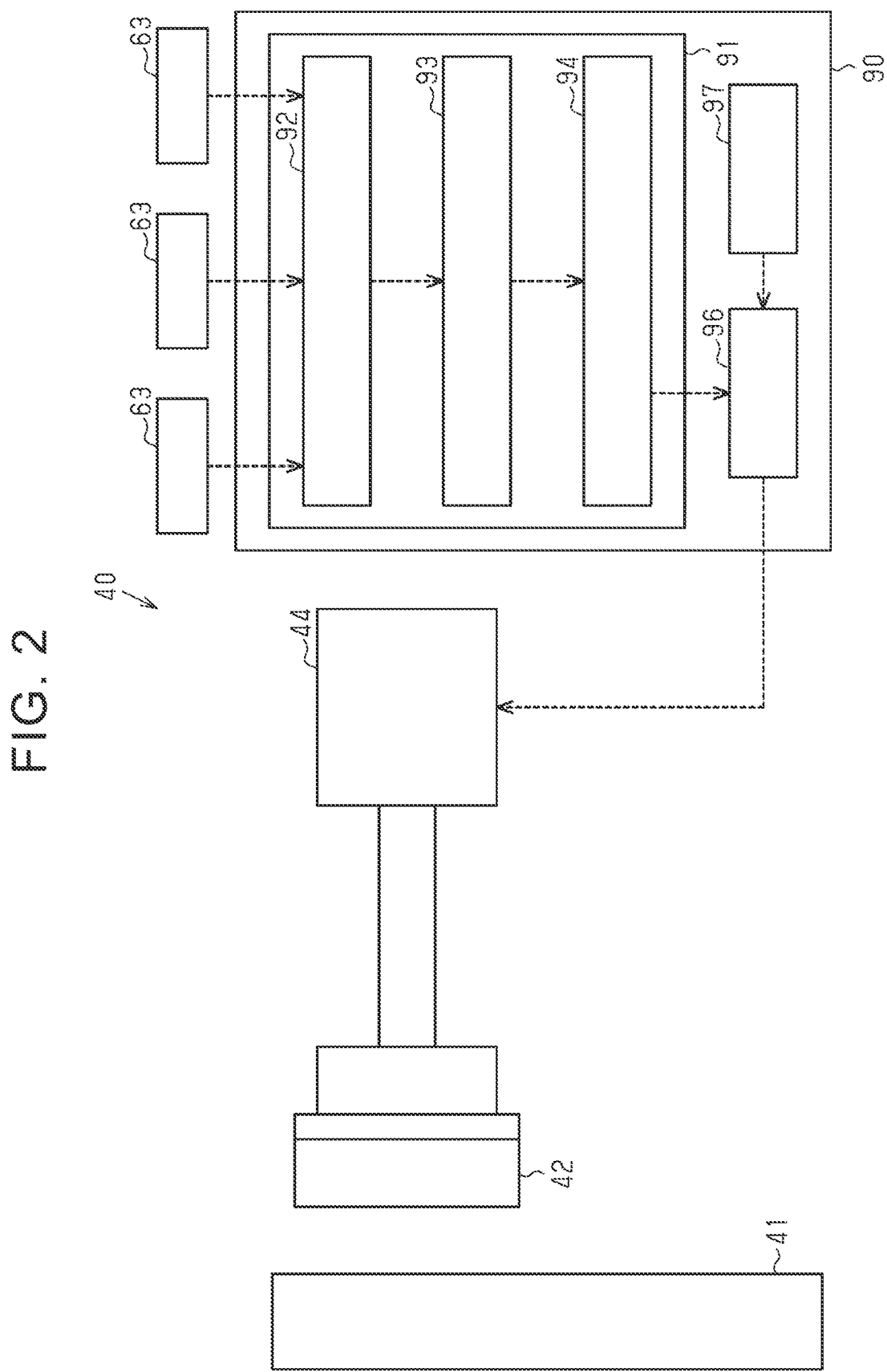
FIG. 2 is a schematic diagram showing a brake electronic control unit (ECU) and a brake device.

The brake device 40 is provided in each wheel of the vehicle 10. The brake device 40 is a disk brake that uses hydraulic pressure to generate braking force. As shown in FIG. 2, the brake device 40 includes a disk 41, a brake pad 42, and an actuator 44 that applies hydraulic pressure to the brake pad 42. That is, the actuator 44 outputs hydraulic pressure. The disk 41 is a rotating body that rotates integrally with the wheel of the vehicle 10. The brake pad 42 is a friction material supported by the vehicle body of the vehicle 10. The hydraulic pressure from the actuator 44 is controlled by the control device 50. The brake device 40 generates braking force in the vehicle 10 by bringing the disk 41 and the brake pad 42 into contact with each other.

The vehicle 10 includes four wheel velocity sensors 101. The wheel velocity sensor 101 is provided for each of the four wheels of the vehicle 10. Each wheel velocity sensor 101 detects the wheel velocity that is the rotational velocity of the corresponding wheel. Note that, in the present embodiment, the four wheels of the vehicle 10 are all driving wheels. That is, the vehicle 10 is a four-wheel drive vehicle.

The vehicle 10 includes an accelerator sensor 102. The accelerator sensor 102 detects an accelerator operation amount that is a depression amount of the accelerator pedal. The vehicle 10 includes a brake sensor 103. The brake sensor 103 detects a brake operation amount that is a depression amount of the brake pedal.

As shown in FIG. 1, the control device 50 includes an advanced safety electronic control unit (ECU) 60, an engine ECU 70, a steering ECU 80, and a brake ECU 90. Each ECU can transmit and receive signals with each other via an internal bus (not shown). Also, the control device 50 acquires signals indicating the wheel velocities of respective wheels from the four wheel velocity sensors 101.

The advanced safety ECU 60 realizes functions related to the driver assistance of the vehicle 10. Specifically, the advanced safety ECU 60 includes a central processing unit (CPU) 61 and a read only memory (ROM) 62. The ROM 62 stores a plurality of applications 63. Each application 63 is a program that realizes the function of an advanced driver assistance system. An example of the applications 63 is an adaptive cruise control (ACC) application for follow-up traveling while maintaining a constant inter-vehicle distance from a preceding vehicle. The ACC application requests each actuator mounted on the vehicle 10 to accelerate and decelerate, so that the vehicle 10 can travel while maintaining a constant distance from the preceding vehicle.

Further, another example of the applications 63 is an auto speed limiter (ASL) application that recognizes a vehicle speed limit and maintains the speed of the vehicle 10 at or below the vehicle speed limit. Furthermore, another example of the applications 63 is a collision damage reducing brake application that automatically brakes the vehicle 10 to reduce the damage of a collision, that is, a so-called autonomous emergency braking (AEB) application. In addition, another example of the applications 63 is a lane keeping assist application that maintains the lane in which the vehicle 10 is traveling, that is, a so-called lane keeping assist (LKA) application.

The CPU 61 acquires detection values from a plurality of sensors (not shown) mounted on the vehicle 10. The CPU 61 uses the detection values from the sensors to execute each application 63 that is stored in the ROM 62. When the CPU 61 executes each application 63, the CPU 61 outputs a first motion request corresponding to the application 63 such that the functions of each application 63 can be realized. Note that the CPU 61 may also execute the applications 63 at the same time. In this case, the CPU 61 outputs a separate first motion request for each executed application 63.

The CPU 61 outputs each first motion request to an ECU that includes a control unit of the actuator that needs to be controlled in order to realize the functions of each application 63. Specifically, the CPU 61 outputs the first motion request to one or more ECUs selected from the engine ECU 70, the steering ECU 80, and the brake ECU 90.

Here, one example of the first motion request that the CPU 61 outputs to the engine ECU 70 is a value indicating a required acceleration to be generated by the vehicle 10. The first motion request output from the CPU 61 to the steering ECU 80 is a value indicating the steering angle of the vehicle 10. Further, one example of the first motion request that the CPU 61 outputs to the brake ECU 90 is a value indicating the required acceleration to be generated by the vehicle 10.

The first motion request output by the CPU 61 as described above does not directly indicate the instruction value output to the actuator 44 of the brake device 40, for example. That is, the first motion request is common to the brake device 40, and does not change in accordance with the type of the brake device 40, for example. On the other hand, the first motion request may differ among devices with different functions, such as the internal combustion engine 20, the steering device 30, and the brake device 40.

The engine ECU 70 is a computer that includes a CPU and a ROM (not shown). The CPU of the engine ECU 70 controls the internal combustion engine 20 by executing a program that is stored in the ROM. That is, the engine ECU 70 is a control device that controls the internal combustion engine 20. In particular, the engine ECU 70 controls the internal combustion engine 20 based on the first motion request from the advanced safety ECU 60.

The steering ECU 80 is a computer that includes a CPU and a ROM (not shown). The CPU of the steering ECU 80 controls the steering device 30 by executing a program that is stored in the ROM. That is, the steering ECU 80 is a control device that controls the steering device 30. In particular, the steering ECU 80 controls the steering device 30 based on the first motion request from the advanced safety ECU 60.

The brake ECU 90 is a computer that includes a CPU and a ROM (not shown). The CPU of the brake ECU 90 controls the brake device 40 by executing a program that is stored in the ROM. That is, the brake ECU 90 is a control device that controls the brake device 40. In particular, the brake ECU 90 controls the brake device 40 based on the first motion request from the advanced safety ECU 60. The operation of the brake ECU 90 is described below in detail.

Brake ECU

Figure 3:
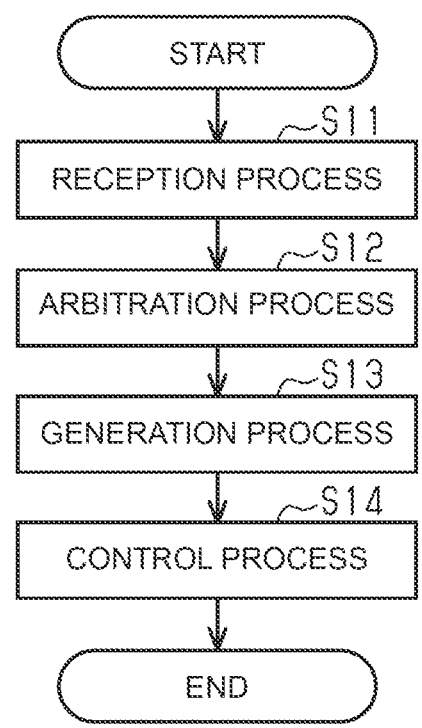
FIG. 3 is a flowchart showing a control method of the brake device.

As shown in FIG. 2, the brake ECU 90 includes a motion manager 91, a brake control unit 96, and a control request unit 97. Although not shown, the brake ECU 90 includes the CPU and the ROM. The CPU of the brake ECU 90 realizes the functions of the motion manager 91 by executing a motion manager program that is stored in the ROM. Specifically, as shown in FIG. 3, the CPU of the brake ECU 90 executes a reception process S11, an arbitration process S12, a generation process S13, and a control process S14 by executing the program that is stored in the ROM. Therefore, the CPU of the brake ECU 90 functions as a reception unit 92, an arbitration unit 93, and a generation unit 94 in the motion manager 91.

On the other hand, the CPU of the brake ECU 90 realizes the functions of the brake control unit 96 by executing a brake control program that is stored in the ROM. The CPU of the brake ECU 90 executes an anti-lock braking system (ABS) control program that is stored in the ROM. Further, the CPU of the brake ECU 90 also executes a traction control (TRC) control program that is stored in the ROM. The CPU of the brake ECU 90 functions as the control request unit 97 by executing the ABS control program and the TRC control program. Note that, the control request unit 97 can calculate an instruction value for the ABS control and an instruction value for the TRC control. Therefore, the brake control unit 96 can also operate based on the instruction value from the control request unit 97 without depending on the instruction value from the motion manager 91.

Brake Control by Motion Manager

As shown in FIG. 3, the brake ECU 90 starts controlling the brake device 40 when the first motion request is input from the advanced safety ECU 60 in order to realize the functions of the advanced driver assistance system. When the control of the brake device 40 is started, the brake ECU 90 first performs the reception process S11. The reception unit 92 performs a process in the reception process S11.

As shown in FIG. 2, the reception unit 92 can receive the required acceleration from the advanced safety ECU 60 as the first motion request corresponding to each application 63. In addition, as described above, the advanced safety ECU 60 may also execute the applications 63 at the same time. In this case, the reception unit 92 receives a plurality of the first motion requests and outputs the first motion requests to the arbitration unit 93.

After that, as shown in FIG. 3, the brake ECU 90 advances the process to the arbitration process S12. The arbitration unit 93 performs a process in the arbitration process S12. As shown in FIG. 2, the arbitration unit 93 arbitrates the first motion request received by the reception unit 92. When there is only one first motion request that is received by the reception unit 92, the arbitration unit 93 selects that first motion request. On the other hand, when there are multiple first motion requests received by the reception unit 92, the arbitration unit 93 arbitrates the first motion requests based on predetermined selection criteria. For example, the arbitration unit 93 selects one first motion request from among the received first motion requests, or selects an allowable range of control based on the received first motion requests.

After that, as shown in FIG. 3, the brake ECU 90 advances the process to the generation process S13. The generation unit 94 performs a process in the generation process S13. As shown in FIG. 2, the generation unit 94 generates a first instruction value of a first operation request to be output to the brake control unit 96 that is mounted on the vehicle 10, based on the arbitration result by the arbitration unit 93.

After that, as shown in FIG. 3, the brake ECU 90 advances the process to the control process S14. The brake control unit 96 performs a process in the control process S14. As shown in FIG. 2, the brake control unit 96 outputs the first instruction value of the first operation request that is generated by the generation unit 94 to the actuator 44 of the brake device 40. As a result, the brake control unit 96 controls the brake device 40 by driving the actuator 44. After that, the brake ECU 90 ends the series of processes.

Feedback Control by Motion Manager

The generation unit 94 of the motion manager 91 executes feedback control on the first instruction value of the first operation request using a deviation between the first motion request and the motion result of the vehicle 10 that is calculated based on any of the detection values of the four wheel velocity sensors 101. Specifically, the generation unit 94 performs a series of processes in the feedback control every time the first instruction value of the first operation request is generated.

Figure 4:
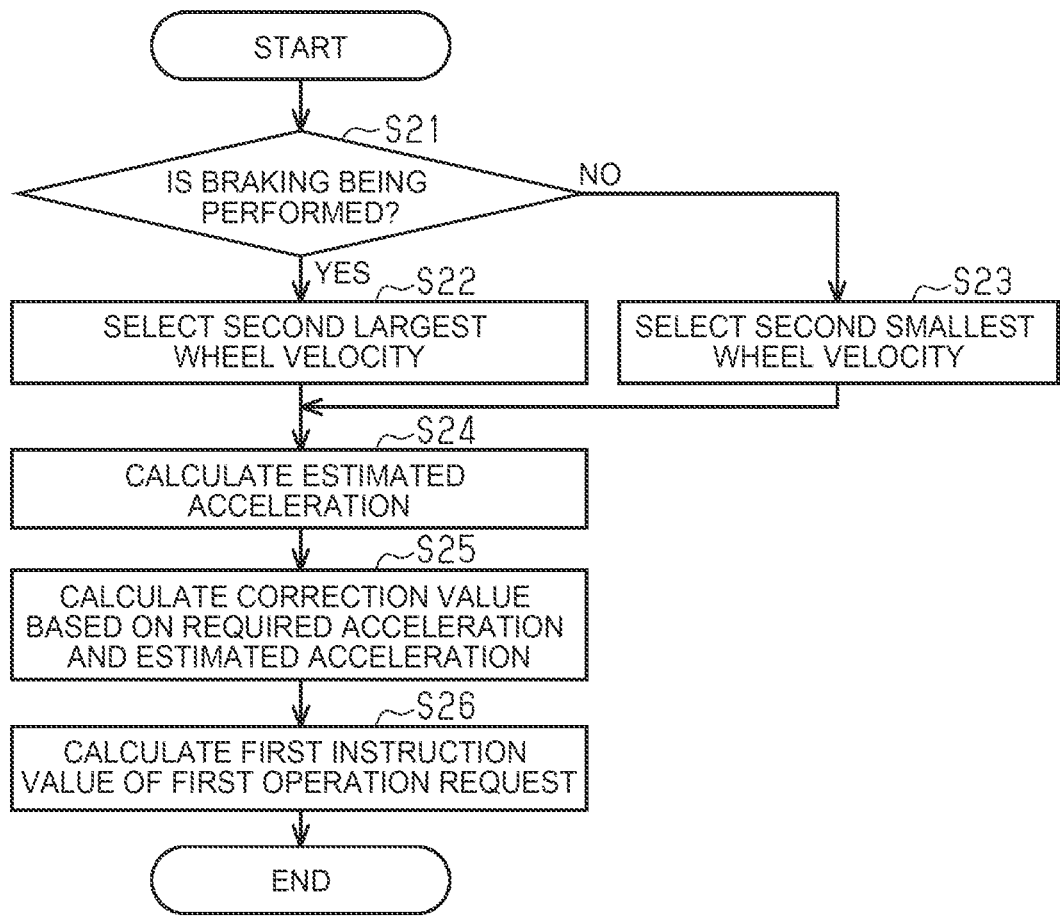
FIG. 4 is a flowchart illustrating feedback control by a motion manager.

As shown in FIG. 4, when the feedback control is started, the generation unit 94 first performs the process in step S21. In step S21, the generation unit 94 determines whether braking is being performed. Specifically, when the required acceleration indicated by the first motion request that is the arbitration result of the arbitration unit 93 is a negative value, the generation unit 94 determines that braking is being performed.

When the generation unit 94 determines that braking is being performed (S21: YES), the generation unit 94 advances the process to step S22. In step S22, the generation unit 94 first selects the detection value of the wheel velocity sensor 101 indicating the second largest vehicle body velocity V from among the vehicle body velocities V indicated by the wheel velocities that are the detection values of the four wheel velocity sensors 101. Next, the generation unit 94 acquires the vehicle body velocity V indicated by the detection value of the selected wheel velocity sensor 101 as the vehicle body velocity V that is the velocity of the vehicle 10.

On the other hand, when the generation unit 94 determines that braking is not being performed (S21: No), the generation unit 94 advances the process to step S23. In step S23, the generation unit 94 first selects the detection value of the wheel velocity sensor 101 indicating the second smallest vehicle body velocity V from among the vehicle body velocities V indicated by the wheel velocities that are the detection values of the four wheel velocity sensors 101. Next, the generation unit 94 acquires the vehicle body velocity V indicated by the detection value of the selected wheel velocity sensor 101 as the vehicle body velocity V that is the velocity of the vehicle 10.

After the process in step S22 or after the process in step S23, the generation unit 94 advances the process to step S24. In step S24, the generation unit 94 calculates the motion result. Specifically, the generation unit 94 calculates an estimated acceleration of the vehicle 10 as the motion result. The estimated acceleration of the vehicle 10 is calculated by time-differentiating the transition of the vehicle body velocity V of the vehicle 10 acquired in step S22 or step S23. That is, the estimated acceleration of the vehicle 10 is the acceleration of the vehicle 10 calculated based on any of the detection values of the four wheel velocity sensors 101. After that, the generation unit 94 advances the process to step S25.

In step S25, the generation unit 94 calculates a correction value for calculating the first instruction value of the first operation request using the deviation between the first motion request and the motion result. Specifically, the generation unit 94 first calculates the deviation between the required acceleration and the estimated acceleration. Next, the generation unit 94 calculates the correction value by multiplying the deviation by a predetermined coefficient. After that, the generation unit 94 advances the process to step S26.

In step S26, the generation unit 94 calculates the first instruction value of the first operation request based on the arbitration result of the arbitration unit 93 and the correction value calculated in step S25. With the above, the generation unit 94 generates the first instruction value of the first operation request. Accordingly, when the estimated acceleration is smaller than the required acceleration, the feedback control is executed on the first instruction value such that the acceleration of the vehicle 10 is increased. Further, when the estimated acceleration is larger than the required acceleration, the feedback control is executed on the first instruction value such that the acceleration of the vehicle 10 is reduced. After that, the generation unit 94 terminates the current series of processes.

ABS Control

The brake ECU 90 executes the ABS control to suppress the wheels from being locked while the vehicle 10 is being braked. The brake ECU 90 executes the ABS control on each of the four wheels.

The brake ECU 90 determines that the wheel may be locked while the vehicle 10 is being braked and when a deceleration slip ratio of the wheel becomes equal to or greater than a predetermined threshold value. While the vehicle 10 is being braked and when the deceleration slip ratio of the wheel is equal to or greater than the predetermined threshold value, the brake ECU 90 executes the ABS control on the corresponding wheel.

The control request unit 97 calculates an instruction value for suppressing locking of the wheels by the ABS control as a second instruction value of a second operation request. The brake control unit 96 then outputs the second instruction value to the actuator 44. That is, in the present embodiment, the ABS control is executed by the control request unit 97 and the brake control unit 96.

Specifically, first, the control request unit 97 determines whether the vehicle 10 is being braked. When an input value from the brake sensor 103 indicates an operating state, the CPU of the brake ECU 90 determines that braking is being performed. On the other hand, when the input value from the brake sensor 103 indicates a non-operating state, the control request unit 97 determines that braking is not being performed.

Next, the control request unit 97 calculates the deceleration slip ratio of each wheel. The deceleration slip ratio is a value indicating the degree of deceleration slip of each wheel. Specifically, the control request unit 97 calculates a difference by subtracting the wheel velocity that is the detection value of the wheel velocity sensor 101 corresponding to each wheel from the vehicle body velocity V. Next, the control request unit 97 calculates a value obtained by dividing the difference by the vehicle body velocity V as the deceleration slip ratio. The vehicle body velocity V calculated by the control request unit 97 for calculating the deceleration slip ratio will be described later.

Next, when the deceleration slip ratio of the wheel becomes equal to or greater than the predetermined threshold value, the control request unit 97 calculates an instruction value for suppressing locking of the wheel as the second instruction value of the second operation request. The control request unit 97 then outputs the second instruction value of the second operation request to the brake control unit 96.

Next, the brake control unit 96 outputs the second instruction value of the second operation request that is generated by the control request unit 97 to the actuator 44 of the brake device 40. With the above, the brake control unit 96 controls the brake device 40 by driving the actuator 44. Specifically, control is executed such that the braking force from the brake device 40 is reduced for a wheel that is likely to be locked due to a high deceleration slip ratio.

TRC Control

The brake ECU 90 executes the TRC control to suppress the wheels from slipping while the vehicle 10 is not being braked. The brake ECU 90 executes the TRC control on each of the four wheels.

The brake ECU 90 determines that the wheel may slip while the vehicle 10 is not being braked and when the acceleration slip ratio of the wheel becomes equal to or greater than a predetermined threshold value. While the vehicle 10 is not being braked and when the acceleration slip ratio of the wheel becomes equal to or greater than the predetermined threshold value, the brake ECU 90 executes the TRC control on the corresponding wheel.

The control request unit 97 calculates an instruction value for suppressing slipping of the wheels by the TRC control as the second instruction value of the second operation request. Then, the brake control unit 96 outputs the second instruction value. That is, in the present embodiment, the TRC control is executed by the control request unit 97 and the brake control unit 96.

Specifically, first, the control request unit 97 determines whether the vehicle 10 is not being braked. When the input value from the brake sensor 103 indicates the non-operating state, the CPU of the brake ECU 90 determines that braking is not being performed. On the other hand, when the input value from the brake sensor 103 indicates the operating state, the control request unit 97 determines that braking is being performed.

Next, the control request unit 97 calculates an acceleration slip ratio of each wheel. The acceleration slip ratio is a value indicating the degree of acceleration slip of each wheel. Specifically, the control request unit 97 calculates a difference by subtracting the vehicle body velocity V from the wheel velocity that is the detection value of the wheel velocity sensor 101 corresponding to each wheel. Next, the control request unit 97 calculates a value obtained by dividing the difference by the vehicle body velocity V as the acceleration slip ratio. Note that, the vehicle body velocity V calculated by the control request unit 97 for calculating the acceleration slip ratio will be described later.

Next, when the acceleration slip ratio of the wheel becomes equal to or greater than the predetermined threshold value, the control request unit 97 calculates an instruction value for suppressing slipping of the wheel as the second instruction value of the second operation request. The control request unit 97 then outputs the second instruction value of the second operation request to the brake control unit 96.

Next, the brake control unit 96 outputs the second instruction value of the second operation request that is generated by the control request unit 97 to the actuator 44 of the brake device 40. With the above, the brake control unit 96 controls the brake device 40 by driving the actuator 44. Specifically, control is executed such that the braking force from the brake device 40 is reduced for a wheel that is likely to be locked due to a high deceleration slip ratio.

Vehicle Body Velocity Selection Control

The control request unit 97 calculates the vehicle body velocity V for executing the ABS control and the TRC control. The control request unit 97 calculates the vehicle body velocity V differently depending on whether the vehicle 10 is being braked. That is, a method of calculating the vehicle body velocity V when the control request unit 97 executes the ABS control differs from a method of calculating the vehicle body velocity V when the control request unit 97 executes the TRC control. This point will be described below. When calculating the vehicle body velocity V, the control request unit 97 performs the following series of processes.

Figure 5:
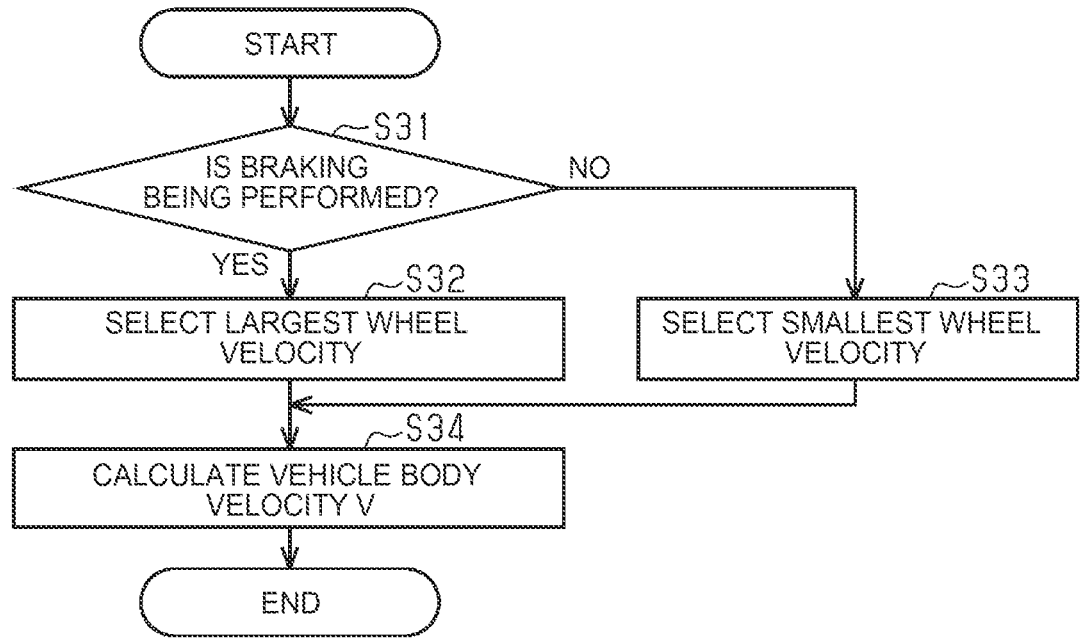
FIG. 5 is a flowchart showing a process of selecting a vehicle body velocity by a control request unit.

As shown in FIG. 5, when calculating the vehicle body velocity V, the control request unit 97 first performs the process in step S31. In step S31, the control request unit 97 determines whether the vehicle 10 is being braked.

When the control request unit 97 determines that braking is being performed (S31: YES), the control request unit 97 advances the process to step S32. That is, when calculating the vehicle body velocity V for executing the ABS control, the control request unit 97 advances the process to step S32. In step S32, control request unit 97 first selects the detection value of the wheel velocity sensor 101 indicating the largest vehicle body velocity V from among the vehicle body velocities V indicated by the detection values of the four wheel velocity sensors 101.

On the other hand, when the control request unit 97 determines that braking is not being performed (S31: NO), the control request unit 97 advances the process to step S33. That is, when calculating the vehicle body velocity V for executing the TRC control, the control request unit 97 advances the process to step S33. In step S33, the control request unit 97 first selects the detection value of the wheel velocity sensor 101 indicating the smallest vehicle body velocity V from among the vehicle body velocities V indicated by the detection values of the four wheel velocity sensors 101.

After the process in step S32 or after the process in step S33, the control request unit 97 advances the process to step S34. In step S34, the control request unit 97 calculates the vehicle body velocity V indicated by the detection value of the selected wheel velocity sensor 101 as the vehicle body velocity V. After that, the control request unit 97 terminates the series of processes.

Operations of Embodiment

In the above embodiment, it is assumed that the control request unit 97 executes the ABS control. In this case, the control request unit 97 acquires the vehicle body velocity V as follows.

Figure 6:
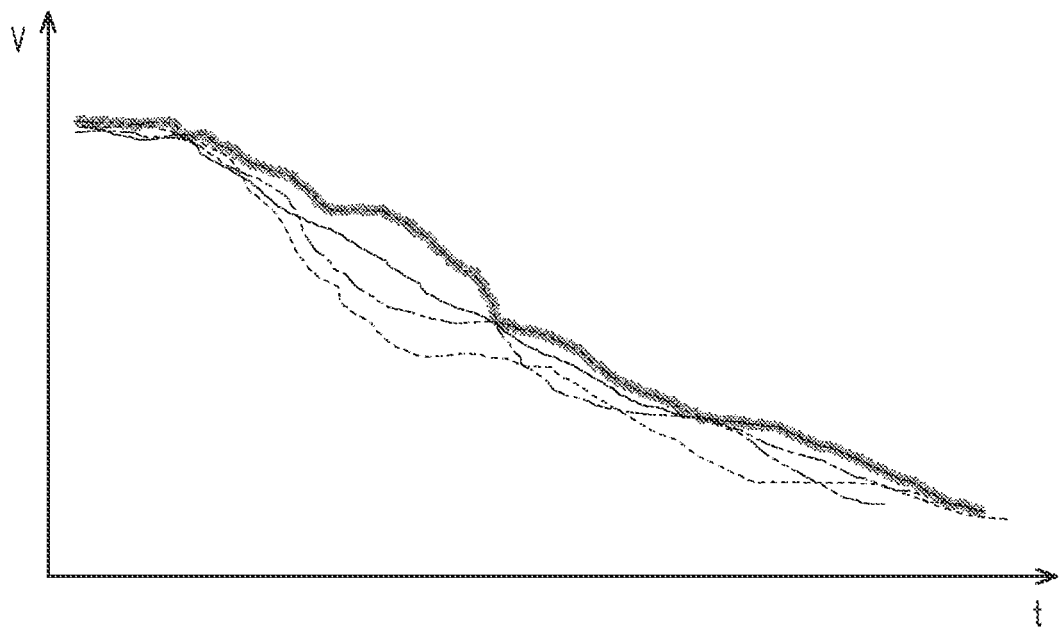
FIG. 6 is a diagram showing the vehicle body velocity when the largest vehicle body velocity is selected from among the vehicle body velocities indicated by the detection values of the four wheel velocity sensors.

As shown in FIG. 6, the control request unit 97 acquires, as the vehicle body velocity V, the vehicle body velocity V from the wheel velocity sensor 101 indicating the largest vehicle body velocity V from among the vehicle body velocities V indicated by the detection values of the four wheel velocity sensors 101. Note that, in FIG. 6, the vehicle body velocities V indicated by the detection values of the four wheel velocity sensors 101 are indicated by a solid line, a broken line, a one-dot chain line, and a two-dot chain line. Further, in FIG. 6, the detection value of the selected wheel velocity sensor 101 is marked with a thick line.

With the above, at each time t, the control request unit 97 acquires, as the vehicle body velocity V, the vehicle body velocity V from the wheel velocity sensor 101 indicating the largest vehicle body velocity V from among the vehicle body velocities V indicated by the detection values of the four wheel velocity sensors 101. It is possible to reliably detect that the wheel is locked by adopting the largest detection value of the wheel velocity sensor 101 as described above. On the other hand, it is possible to reduce a possibility of erroneous detection that the wheel is locked even though the wheel is not locked.

Meanwhile, it is assumed that the generation unit 94 of the motion manager 91 executes the feedback control. In this case, the generation unit 94 selects the wheel velocity sensor 101 as follows and calculates the estimated acceleration.

Figure 7:
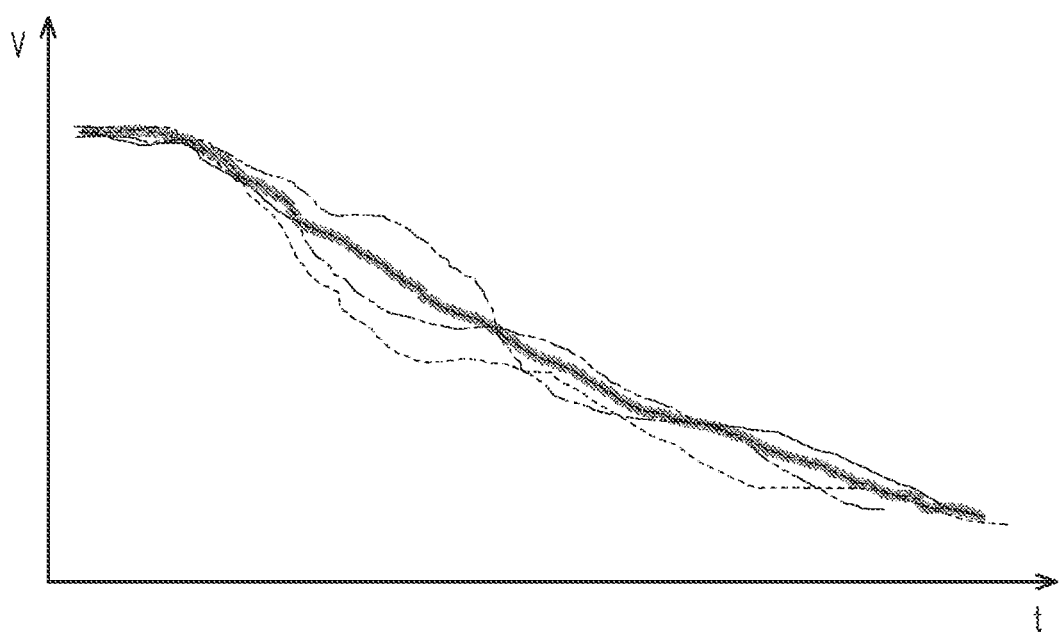
FIG. 7 is a diagram showing the vehicle body velocity when the second largest vehicle body velocity is selected from among the vehicle body velocities indicated by the detection values of the four wheel velocity sensors.

As shown in FIG. 7, the generation unit 94 first selects the detection value of the wheel velocity sensor 101 indicating the second largest vehicle body velocity V from among the vehicle body velocities V indicated by the detection values of the four wheel velocity sensors 101. Note that, in FIG. 7, the vehicle body velocities V indicated by the detection values of the four wheel velocity sensors 101 are indicated by a solid line, a broken line, a one-dot chain line, and a two-dot chain line. Further, in FIG. 7, the detection value of the selected wheel velocity sensor 101 is marked with a thick line.

Next, the generation unit 94 acquires the vehicle body velocity V indicated by the detection value of the selected wheel velocity sensor 101 as the vehicle body velocity V that is the velocity of the vehicle 10. With the above, at each time t, the generation unit 94 selects the vehicle body velocity V from the wheel velocity sensor 101 indicating the second largest vehicle body velocity V from among the vehicle body velocities V indicated by the detection values of the four wheel velocity sensors 101. Next, the generation unit 94 acquires, as the vehicle body velocity V, the vehicle body velocity V indicated by the detection value of the selected wheel velocity sensor 101. Next, the generation unit 94 calculates the estimated acceleration from the obtained vehicle body velocity V. Then, the generation unit 94 executes the feedback control on the first instruction value of the first operation request using the deviation between the estimated acceleration that is the motion result and the required acceleration that is the first motion request.

Effects of Embodiment (1) According to the above embodiment, the brake ECU 90 calculates the motion result in the feedback control as follows. When the vehicle 10 is being braked, the brake ECU 90 calculates the motion result based on the detection value of the wheel velocity sensor 101 indicating the second largest vehicle body velocity V among the vehicle body velocities V indicated by the four wheel velocity sensors 101. On the other hand, when the vehicle 10 is not being braked, the brake ECU 90 calculates the motion result based on the detection value of the wheel velocity sensor 101 indicating the second smallest vehicle body velocity V among the vehicle body velocities V indicated by the four wheel velocity sensors 101.

One wheel velocity sensor 101 of the four wheel velocity sensors 101 may fail. As a result, the failed wheel velocity sensor 101 may make an erroneous detection. In this case, the detection value of the wheel velocity sensor 101 that has made an erroneous detection may significantly deviate from the detection values of the other three wheel velocity sensors 101. In this case, it is assumed that the brake ECU 90 calculates the motion result based on the detection value of the wheel velocity sensor 101 indicating the largest vehicle body velocity V or the smallest vehicle body velocity V among the vehicle body velocities V indicated by the four wheel velocity sensors 101. In this case, the motion result is calculated based on the detection value of the wheel velocity sensor 101 that has made an erroneous detection.

In this regard, according to the above embodiment, when the vehicle 10 is being braked, the brake ECU 90 calculates the motion result in the feedback control based on the detection value of the wheel velocity sensor 101 indicating the second largest vehicle body velocity V. Therefore, even when the detection value of the failed wheel velocity sensor 101 becomes an excessively large value, the motion result is calculated based on the detection value of the wheel velocity sensor 101 indicating the next largest vehicle body velocity V after the wheel velocity sensor 101 of which the detection value is excessively large. Therefore, it is possible to suppress the calculated motion result from deviating from the actual motion result. Further, adoption of the detection value of the wheel velocity sensor 101 indicating the second largest vehicle body velocity V makes it possible to suppress the vehicle body velocity V lower than the actual vehicle body velocity V from being calculated. This suppresses an unintended reduction in the amount of braking of the vehicle 10.

Further, according to the above embodiment, when the vehicle 10 is not being braked, the brake ECU 90 calculates the motion result in the feedback control based on the detection value of the wheel velocity sensor 101 indicating the second smallest vehicle body velocity V. Therefore, even when the detection value of the failed wheel velocity sensor 101 becomes an excessively small value, the motion result is calculated based on the detection value of the wheel velocity sensor 101 indicating the next smallest vehicle body velocity V after the wheel velocity sensor 101 of which the detection value is excessively small. Therefore, it is possible to suppress the calculated motion result from deviating from the actual motion result. Further, adoption of the detection value of the wheel velocity sensor 101 indicating the second smallest vehicle body velocity V makes it possible to suppress the vehicle body velocity V higher than the actual vehicle body velocity V from being calculated. This suppresses an unintended reduction in the amount of acceleration of the vehicle 10.

(2) According to the above embodiment, the motion manager 91 of the brake ECU 90 includes the reception unit 92, the arbitration unit 93, and the generation unit 94. The generation unit 94 executes the feedback control. Therefore, in the feedback control by the motion manager 91 of the brake ECU 90, it is possible to suppress the calculated motion result from deviating from the actual motion result.

(3) According to the above embodiment, the first motion request is the required acceleration. Further, the motion result is the estimated acceleration of the vehicle 10 calculated based on any of the detection values of the four wheel velocity sensors 101. Therefore, when the applications 63 request the required acceleration, it is possible to suppress the acceleration of the vehicle 10 as the first motion result from deviating from the required acceleration.

(4) Unlike the feedback control of the brake ECU 90, the vehicle body velocity V may be required to calculate the second instruction value for controlling the operation of the actuator 44. Specifically, as in the ABS control and the TRC control, the vehicle body velocity V may be acquired to identify locked wheels or slipping wheels. In the case of the above controls, among the vehicle body velocities V calculated from the detection values of the four wheel velocity sensors 101, the highest vehicle body velocity V or the lowest vehicle body velocity V needs to be adopted. According to the above embodiment, the detection value of which wheel velocity sensor 101 needs to be adopted is not uniformly determined in all controls, but is changed for each control. Therefore, during the feedback control by the motion manager 91, it is possible to suppress execution of inappropriate feedback control due to a failure of the wheel velocity sensor 101, and during the ABS control and the TRC control, the detection value of more appropriate wheel velocity sensor 101 can be used.

(5) According to the above embodiment, the motion manager 91 calculates the first instruction value by executing the feedback control. The control request unit 97 calculates the second instruction value based on the vehicle body velocity V in control different from the feedback control by the motion manager 91. Therefore, the detection value of the wheel velocity sensor 101 to be adopted can be distinguished depending on whether the control is executed by the motion manager 91 or not executed by the motion manager 91.

Other Embodiments

The above embodiment can be implemented with the following modifications. The above embodiment and the following modifications can be combined with each other within a technically consistent range to be implemented.

The vehicle 10 may include a motor that serves as a driving source for the vehicle 10 in addition to or instead of the internal combustion engine 20. In this case, the control device 50 may include a motor ECU that controls the motor in addition to or instead of the engine ECU 70.

The actuator 44 is not limited to an actuator that outputs hydraulic pressure. The type may be appropriately changed to a different type in accordance with the braking force that is generated by the brake device 40, etc. Even in this case, the generation unit 94 can generate an appropriate first instruction value of the first operation request in accordance with the type of the actuator 44.

In the above embodiment, the motion manager 91 is included in the brake ECU 90, and the control of the brake device 40 has been described as an example, but the ECU that includes the motion manager is not limited to this. For example, the motion manager may be included in the engine ECU 70 in addition to or instead of the brake ECU 90. In this case, for example, the generation unit of the motion manager may generate the first instruction value of the first operation request in accordance with the actuator of the internal combustion engine 20.

Each ECU may be configured as a circuitry including one or more processors that execute various processes in accordance with a computer program (software). Each ECU may be configured as a circuitry including one or more dedicated hardware circuitries that execute at least part of the various types of processing, such as an application specific integrated circuit (ASIC), or a combination thereof. The processor includes a CPU and a memory such as a random access memory (RAM) and a ROM. The memory stores a program code or an instruction configured to cause the CPU to perform processes. The memory, that is, the computer-readable medium includes any available media that can be accessed by a general purpose or special purpose computer.

The control device 50 may be divided into a device that includes the motion manager 91 and a device that includes the brake control unit 96. That is, the CPU that executes the reception process S11, the arbitration process S12, and the generation process S13 may be different from the CPU that executes the control process S14.

In the above embodiment, the applications 63 are executed by the same CPU 61 in the advanced safety ECU 60, but the present disclosure is not limited to this. Individual applications 63 may be executed by different CPUs.

The applications 63 are not limited to the applications exemplified in the above embodiment. For example, the application 63 may be an intelligent speed assistance (ISA) application that controls the speed of the vehicle 10 such that the speed does not exceed the upper limit speed.

Brake ECU

Although the brake ECU 90 calculates the second instruction value of the second operation request, an ECU different from the brake ECU 90 may calculate the second instruction value of the second operation request. For example, the advanced safety ECU 60 may calculate the second instruction value of the second operation request by executing an application for the ABS control and an application for the TRC control as applications separate from the applications 63. In this case, the second instruction value may be input to the brake control unit 96 without intervening the motion manager 91.

For the control request unit 97, unlike the feedback control, the ABS control and the TRC control are described as examples of the process of acquiring the vehicle body velocity V. However, the present disclosure is not limited to this. As long as the control is based on the premise that the wheel velocities of the four wheels are different, the control can be the control executed by the control request unit 97 because it is highly necessary to acquire the vehicle body velocity V.

The method of selecting the wheel velocity sensor 101 for acquiring the vehicle body velocity V in the control request unit 97 is not limited to the above embodiment. For example, in the case where the vehicle 10 is a two-wheel drive vehicle, when the vehicle 10 is not braked, the wheel velocity sensor 101 having the large vehicle body velocity V indicated by the detection value among the wheel velocity sensors 101 corresponding to the rolling wheels from the four wheel velocity sensors 101 may be selected.

In the brake ECU 90, the control request unit 97 may be omitted. That is, it is not necessary to calculate the second instruction value of the second operation request for controlling the operation of the actuator 44 based on the vehicle body velocity V.

The first motion request and the first motion result are not limited to the acceleration of the vehicle 10. For example, the first motion request and the first motion result may be the vehicle body velocity V. The brake ECU 90 may not include the motion manager 91. In this case, the brake ECU 90 may execute the feedback control. Further, the brake ECU 90 may calculate the motion result in the feedback control based on the detection value of the wheel velocity sensor 101 indicating the second largest vehicle body velocity V or the second smallest vehicle body velocity V among the vehicle body velocities V indicated by the four wheel velocity sensors 101. It is suitable when there is no need for arbitration, such as when there is only one application 63.

APPENDIX

The following are technical ideas that can be grasped from the above embodiment and modifications.

APPENDIX I

A vehicle control device that
calculates a first instruction value of a first operation request for controlling an operation of an actuator mounted on a vehicle based on a motion request from an application,
executes feedback control on the first instruction value using a deviation between the motion request and a motion result of the vehicle that is calculated based on one of detection values of four wheel velocity sensors,
calculates the motion result in the feedback control based on a first detection value of the wheel velocity sensor indicating a second largest vehicle body velocity among vehicle body velocities indicated by the detection values of the four wheel velocity sensors when the vehicle is braked, and
calculates the motion result in the feedback control based on a second detection value of the wheel velocity sensor indicating a second smallest vehicle body velocity among the vehicle body velocities indicated by the detection values of the four wheel velocity sensors when the vehicle is not braked.

APPENDIX II

The vehicle control device according to Appendix I, further comprising
a motion manager mounted on the vehicle, wherein
the motion manager includes:
a reception unit that receives the motion request that corresponds to an application from each of one or more applications;
an arbitration unit that arbitrates one or more motion requests that is received by the reception unit; and
a generation unit that generates the first instruction value of the first operation request to be output to a control unit for the actuator based on arbitration result of the arbitration unit, and
the generation unit executes the feedback control.

APPENDIX III

The vehicle control device according to Appendix I or II, wherein:
the motion request is an acceleration requested to the vehicle; and
the motion result is an acceleration of the vehicle calculated based on one of the detection values of the four wheel velocity sensors.

APPENDIX IV

The vehicle control device according to any one of Appendixes I to III, wherein the vehicle control device
calculates a second instruction value for controlling an operation of the actuator based on the vehicle body velocity,
calculates the vehicle body velocity based on a third detection value of the wheel velocity sensor indicating a largest vehicle body velocity among the vehicle body velocities indicated by the detection values of the four wheel velocity sensors when the vehicle is braked, and
calculates the vehicle body velocity based on a fourth detection value of the wheel velocity sensor indicating a smallest vehicle body velocity among the vehicle body velocities indicated by the detection values of the four wheel velocity sensors when the vehicle is not braked.

APPENDIX V

The vehicle control device according to Appendix IV, further comprising:
- a motion manager that is mounted on the vehicle and calculates the first instruction value by executing the feedback control; and
- a control request unit that calculates the second instruction value separately from the motion manager.

What is claimed is:

1. A vehicle control device comprising one or more processors configured to:
   calculate a first instruction value of an operation request for controlling an operation of an actuator mounted on a vehicle based on a motion request from an application; and
   execute feedback control on the first instruction value using a deviation between the motion request and a motion result of the vehicle that is calculated based on one of detection values of four wheel velocity sensors,
   wherein the one or more processors are further configured to:
   calculate the motion result in the feedback control based on a first detection value indicating a second largest vehicle body velocity among vehicle body velocities indicated by detection values of the four wheel velocity sensors when the vehicle is braked; and
   calculate the motion result in the feedback control based on a second detection value indicating a second smallest vehicle body velocity among the vehicle body velocities indicated by the detection values of the four wheel velocity sensors when the vehicle is not braked; and,
   a motion manager mounted on the vehicle, wherein
   the motion manager includes the one or more processors, and
   the one or more processors are configured to:
   receive the motion request that corresponds to an application from each of one or more applications;
   arbitrate one or more motion requests that is received;
   generate the first instruction value of the operation request to be output to a control unit for the actuator based on arbitration result; and
   execute the feedback control.

2. The vehicle control device according to claim 1, wherein:
   the motion request is an acceleration requested to the vehicle; and
   the motion result is an acceleration of the vehicle calculated based on one of the detection values of the four wheel velocity sensors.

3. The vehicle control device according to claim 1, wherein the one or more processors are further configured to:
   calculate a second instruction value for controlling an operation of the actuator based on a vehicle body velocity;
   calculate the vehicle body velocity based on a third detection value indicating a largest vehicle body velocity among the vehicle body velocities indicated by the detection values of the four wheel velocity sensors when the vehicle is braked; and
   calculate the vehicle body velocity based on a fourth detection value indicating a smallest vehicle body velocity among the vehicle body velocities indicated by the detection values of the four wheel velocity sensors when the vehicle is not braked.

4. The vehicle control device according to claim 3, wherein
   the one or more processors include a first processor and a second processor,
   the motion manager includes the first processor,
   the first processor is configured to calculate the first instruction value by executing the feedback control, and
   the second processor is configured to calculate the second instruction value separately from the motion manager.

* * * * *